(12) United States Patent
Kilday et al.

(10) Patent No.: US 7,287,766 B2
(45) Date of Patent: Oct. 30, 2007

(54) PIANO DOLLY

(75) Inventors: Gary R. Kilday, Cincinnati, OH (US); Michael W. Pritt, Cincinnati, OH (US)

(73) Assignee: GRK Manufacturing Company, Cincinnati, OH (US)

( * ) Notice: Subject to any disclaimer, the term of this patent is extended or adjusted under 35 U.S.C. 154(b) by 197 days.

(21) Appl. No.: 11/174,926

(22) Filed: Jul. 5, 2005

(65) Prior Publication Data

US 2007/0007736 A1    Jan. 11, 2007

(51) Int. Cl.
B62B 3/02 (2006.01)
(52) U.S. Cl. .................... 280/79.11; 280/35; 280/43.11
(58) Field of Classification Search ................. 280/35, 280/639, 42, 43.11, 79.11; D34/28
See application file for complete search history.

(56) References Cited

U.S. PATENT DOCUMENTS

| 9,283 | A | * | 9/1852 | Woodruff ................. 242/478.4 |
| 525,298 | A | * | 8/1894 | Thiele et al. ................ 280/35 |
| 649,300 | A | | 5/1900 | Hall et al. |
| 1,283,166 | A | | 10/1918 | Harper |
| 1,322,719 | A | | 11/1919 | Nelson |
| 1,887,067 | A | | 11/1932 | Pehrsson |
| 2,613,083 | A | | 10/1952 | Moludy |
| 2,878,028 | A | * | 3/1959 | Long ........................... 280/35 |
| 3,507,402 | A | | 4/1970 | Barbee |
| 3,710,670 | A | | 1/1973 | Winkler |
| 4,166,638 | A | * | 9/1979 | De Prado ................... 280/638 |
| 4,471,971 | A | * | 9/1984 | Keesler .................... 280/79.11 |
| 4,475,714 | A | | 10/1984 | Heiskell et al. |
| 4,969,657 | A | * | 11/1990 | Kaufmann ............... 280/79.11 |
| 5,726,368 | A | | 3/1998 | Shaw |
| 2004/0227316 | A1 | * | 11/2004 | Drummond .............. 280/79.11 |

FOREIGN PATENT DOCUMENTS

JP     9-81120     3/1997

OTHER PUBLICATIONS

GRK Manufacturing Company, *Quality Craftsmanship*, brochure, circa 1999, cover page, pp. 11 and 14 and rear page.
Piano Showcase, *#4—Dollies, Grand Piano Trucks and Moving Equipment*, Internet website pages, date of posting on Internet not known by applicant, six pages total.

* cited by examiner

*Primary Examiner*—Christopher P. Ellis
*Assistant Examiner*—John D Walters
(74) *Attorney, Agent, or Firm*—Wood, Herron & Evans, L.L.P.

(57) ABSTRACT

A dolly for moving a piano is provided and includes a base having first and second legs, with the first leg having a longitudinal centerline and the second leg being pivotally coupled to the first leg for rotation relative to the first leg. A plurality of receptacles are mounted to the base, with each of the receptacles being operatively effective for receiving a castor mounted to a leg of the piano. First and second ones of the receptacles are mounted to the first leg and spaced apart from one another along the longitudinal centerline of the first leg, with a third one of the receptacles being mounted to the second leg. A plurality of castors are mounted to the base and are operatively effective for rolling along a surface.

14 Claims, 5 Drawing Sheets

PIANO DOLLY

FIELD OF THE INVENTION

The present invention relates to a dolly, and more particularly, to a dolly for moving a piano from one location to another.

BACKGROUND OF THE INVENTION

Piano dollies are well known in the art and are used to move pianos to and from the place of use, such as the stage of an auditorium, opera house or the like. Known dollies include those which can be used to support and move grand pianos, having three legs. Dollies of this type, which are sometimes referred to as "spider dollies", typically have a central hub formed from two vertically spaced plates, and three legs extending radially outwardly from between the plates. Each leg is pivotally mounted at its inner end to the central hub so that each leg may be rotated relative to the hub to accommodate pianos of different shapes. To provide further adjustability, each of the three legs of known spider dollies are typically adjustable in length.

The distal ends of the legs of known spider dollies typically terminate in a Z-shaped member. A relatively large swiveling-type caster is mounted under the high, horizontally extending portion of each Z-shaped member while the lower, horizontally extending portion of each Z-shaped member carries a cup for accepting a caster mounted to one of the piano legs. In this manner, it is only necessary to lift the piano a relatively small vertical distance to position it on the dolly, but the dolly can still utilize relatively large casters to facilitate moving heavy pianos.

While spider dollies have been advantageously used for many years, they are subject to some disadvantages. For example, the design of a typical spider dolly does not lend itself to pre-assembly before shipping. Instead, a spider dolly is usually assembled at the location of use so that the central hub can be positioned under the piano, followed by rotation of each leg relative to the hub and adjustment of the length of each leg to accommodate the size and shape of the particular piano. These angular and length adjustments are very difficult to make in advance.

Additionally, grand pianos typically have a pedal lyre that extends below the main body of the piano toward the floor the piano rests on, in addition to the three support legs. For smaller pianos of this type, the location of the pedal lyre can preclude the use of a spider dolly due to interference between the lyre and the central hub of the dolly.

Another disadvantage with spider dollies is that they are sometimes considered to be somewhat unsightly and can detract from the aesthetic beauty of the piano. This can be particularly problematic in some circumstances. For instance, if a piano will be used for one or more acts of an opera or play, but not throughout the entire performance, the piano may remain mounted on the dolly during the performance so it can be quickly removed from the stage between acts. In instances such as this, the unattractive visual appearance of a spider dolly is undesirable.

Additionally, the central hub and number of component parts are heavier and more costly, both with regard to part cost and shipping cost, than the simpler design provided by the dolly of the present invention.

In view of the foregoing, there is a continuing need for an improved dolly for moving a piano.

SUMMARY OF THE INVENTION

Accordingly, the present invention is directed to a dolly for moving a piano comprising a base having first and second legs with the first leg having a longitudinal centerline and the second leg being pivotally coupled to the first leg for rotation relative to the first leg. The dolly further includes a plurality of receptacles mounted to the base, with each of the receptacles being operatively effective for receiving a caster mounted to a leg of the piano. First and second ones of the receptacles are mounted to the first leg and spaced apart from one another along the longitudinal centerline of the first leg. A third one of the receptacles is mounted to the second leg. The dolly further includes a plurality of casters mounted to the base and operatively effective for rolling along a surface.

Additionally, various embodiments of the dolly of the present invention can include one or more of the subsequently described features. For instance, both the first and second legs can have adjustable lengths. The first leg can include first and second end members and a sleeve disposed intermediate of the first and second end members. Each of the first and second end members can be telescopically engaged with the sleeve and partially disposed within the sleeve. Similarly, the second leg can include first and second end members and a sleeve disposed intermediate of the first and second end members, with each of the first and second end members being telescopically engaged with the sleeve and disposed partially within the sleeve.

With regard to the first leg, the first end member can include a first, relatively higher, substantially horizontally extending portion, a second, relatively lower, substantially horizontally extending portion and a substantially vertically extending portion interconnecting the first and second substantially horizontally extending portions. The second end member of the first leg can be similarly configured, to include a first, relatively higher, substantially horizontally extending portion, a second, relatively lower, substantially horizontally extending portion and a substantially vertically extending portion interconnecting the first and second substantially horizontally extending portions. One of the receptacles, which can be flanged cups, can be mounted to the relatively lower, substantially horizontally extending portion of the first end member of the first leg, while the other flanged cup can be mounted to the relatively lower, substantially horizontally extending portion of the second end member of the first leg. Two of the casters can be mounted to the first leg, with one being mounted to the relatively higher, substantially horizontally extending portion of each of the first and second end members of the first leg.

With regard to the second leg, the first end member of the second leg can be pivotally coupled, at one end thereof, to the first leg and telescopically engaged, at the other end thereof, with the sleeve of the second leg. In one embodiment, the dolly can further include a coupling member extending between and coupling the first and second legs. The coupling member can be secured to the first leg at one end thereof and coupled to the second leg via a pivot at an opposite end thereof, with the second leg being rotatable about a vertical axis passing through the pivot. The second end member of the second leg can include a first, relatively higher, substantially horizontally extending portion, a second relatively lower, substantially horizontally extending portion, and a substantially vertically extending portion interconnecting the first and second substantially horizontally extending portions, similar to the configuration of the first and second end members of the first leg. A third one of the flanged cups can be mounted to the second, relatively lower, substantially horizontally extending portion of the second end member of the second leg and the third one of the casters can be mounted to the relatively higher, substantially horizontally extending portion of the second end member of the second leg.

According to a second aspect of the present invention, a method is provided for manufacturing a dolly for use in supporting and moving a piano comprising the steps of fabricating a first leg having a longitudinal centerline and fabricating a second leg. The method also includes the step of pivotally coupling the second leg to the first leg using a single pivot, for rotation relative to the first leg. Additionally, the method includes the steps of mounting a pair of receptacles to the first leg and spacing the first and second ones of the pair of receptacles apart from one another along the longitudinal centerline of the first leg, with each of the receptacles being operatively effective for receiving a caster mounted to a leg of the piano. The method further includes mounting a third receptacle to the second leg of the dolly at a position spaced apart from the single pivot, with the third receptacle also being operatively effective for receiving a caster mounted to the leg of a piano. Additionally, the method includes the steps of mounting a pair of casters, spaced apart from one another, to the first leg, and mounting a third caster to the second leg, with each of the caters being operatively effective for rolling along a surface.

The various embodiments of the present invention can provide one or more of the following advantages. The lack of the central hub used by conventional spider dollies coupled with the use of a single pivot to interconnect the first and second legs of the dolly of the present invention, as compared to the use of three separate legs each pivotally coupled to the central hub of conventional spider dollies, significantly reduces the complexity of adjusting the piano dolly of the present invention to fit the shape and size of a particular piano, as compared to the adjustments required when using a conventional spider dolly. Part of this simplification is achieved by mounting two of the flanged cups to the first leg of the dolly along a straight line, with each of the cups being effective for receiving a caster mounted to one of the legs of the piano. In view of the foregoing simplification, the amount of assembly that can be achieved prior to shipping is increased relative to that which can typically be done with conventional spider dollies, such that the installation of the piano dolly of the present invention at the point of use is simpler.

The elimination of the central hub of the conventional spider dollies also provides the following advantages. In the first instance, a significant weight reduction is achieved, which is estimated to be about 15% reduction in weight as compared to conventional spider dollies accommodating pianos of like size and weight. Furthermore, elimination of the central hub used with conventional spider dollies, eliminates the potential problem of interference with a pedal lyre mounted to the piano. Accordingly, the piano dolly of the present invention can be used with relatively smaller grand pianos, having pedal lyres, whereas conventional spider dollies typically cannot.

The simpler and less complex design of the piano dolly of the present invention, as compared to conventional spider dollies, also results in fewer parts, and therefore less weight and less cost, both with regard to parts cost and shipping cost. The simpler design is also aesthetically more pleasing, as it is more streamlined as compared to conventional spider dollies, and therefore will detract less from the aesthetic beauty of the pianos which they support.

BRIEF DESCRIPTION OF THE DRAWINGS

These and other features, aspects, and advantages of the present invention will become better understood with regard to the following description, and accompanying drawings wherein.

DETAILED DESCRIPTION

Figure 1:
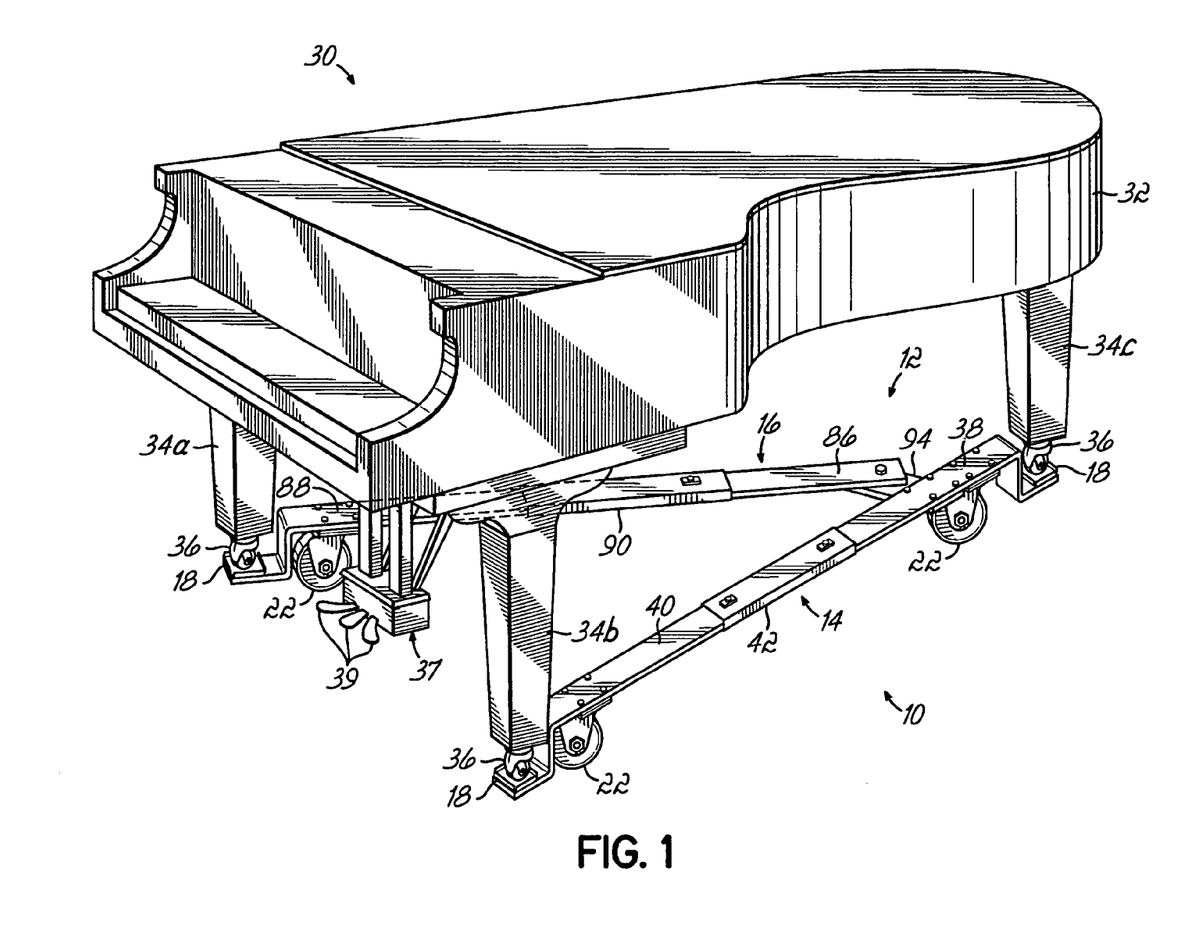
FIG. 1 is a perspective view of a dolly according to one embodiment of the present invention, with the dolly supporting a piano thereon.

Referring now to the drawings, FIG. 1 is a perspective view illustrating a dolly 10 according to one embodiment of the present invention. The dolly 10 has a base 12 that includes first 14 and second 16 legs. The second leg 16 is pivotally coupled to the first leg 14, for rotation relative to the first leg 14. The dolly 10 further includes a plurality of receptacles 18 mounted to the base 12. As shown in FIG. 1, two of the receptacles 18 are mounted to, or located on, the first leg 14 and are spaced apart from one another along a longitudinal centerline, or axis, 20 (shown in FIG. 3) of the first leg 14. The third one of the receptacles 18 is mounted to, or located on, the second leg 16. Dolly 10 further includes a plurality of conventional casters, or roller assemblies, 22 mounted to the base 12 and operatively effective for rolling along a surface (not shown). Each of the casters 22 is preferably a swiveling-type caster, with each of the casters 22 including a wheel 24, rotatable about a horizontal axis (not shown) passing through the center of each wheel 24 and pivotable about a vertical axis (not shown) passing through an upper portion 26 of a mount structure 28 of caster 22.

FIG. 1 illustrates the piano dolly 10 in use, supporting a piano 30, which can be a grand piano. Piano 30 includes a body portion 32 and a plurality of legs, designated 34a, 34b, and 34c, attached to and extending downwardly from the body 32. The piano 30 further includes a plurality of casters 36, with one of the casters 36 being mounted to each of the legs 34a, 34b, and 34c. Additionally, piano 30 includes a conventional pedal lyre, indicated generally at 37 in FIG. 1, that is suspended from the body 32 of piano 30. Pedal lyre 37 includes a plurality of foot pedals 39. As shown in FIG. 1, each of the receptacles 18 of dolly 10 receives one of the casters 36 of piano 30. With piano 30 mounted to dolly 10 as shown in FIG. 1, the combination of the dolly 10 and piano 30 can be easily moved from one location to another. Additionally, as may be appreciated with reference to FIG. 1, the dolly 10 of the present invention can be used with pianos such as piano 30 that include a pedal lyre, such as pedal lyre 37, without interfering with the pedal lyre. Typically, this is not true with conventional spider dollies.

In the illustrative embodiment, the first leg 14 of dolly 10 includes a first end member 38, a second end member 40 and a sleeve 42 disposed intermediate of the first 38 and second 40 end members. As may be appreciated with reference to FIG. 2, that illustrates legs 14 and 16 in an exploded assembly view, and FIG. 3, which illustrates legs 14 and 16 assembled, the first end member 38 and the second end member 40 of leg 14 are telescopically engaged with sleeve 42 and are partially disposed within sleeve 42.

Figure 6:
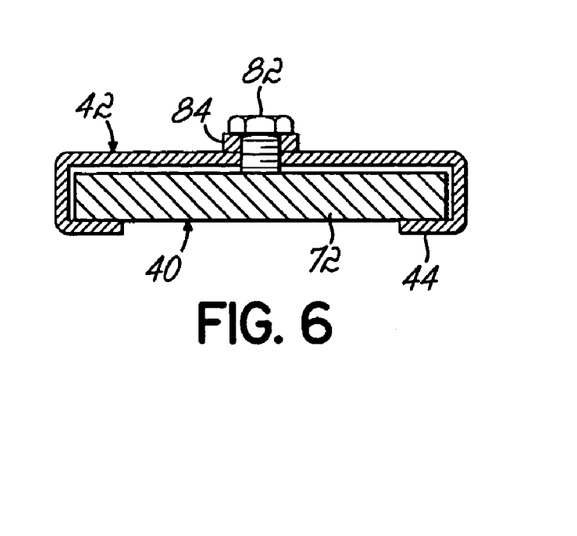
FIG. 6 is a cross-sectional view taken along line 6-6 in FIG. 3.

In the illustrative embodiment, the first end member 38 and second end member 40 are bars having a substantially rectangular cross-section, as may be appreciated regarding member 40 with reference to FIG. 6, and sleeve 42 comprises a tube or channel having a substantially rectangular cross-section, with a bottom wall 44 being partially open. However, one skilled in the art may appreciate that the first end member 38, second end member 40 and sleeve 42 may have a variety of other configurations within the scope of the present invention. For instance, the first 38 and second 40 end members can be made of rectangular tubing that is sized to fit within sleeve 42 such that the end members 38, 40 can be telescopically engaged with sleeve 42.

Figure 7:
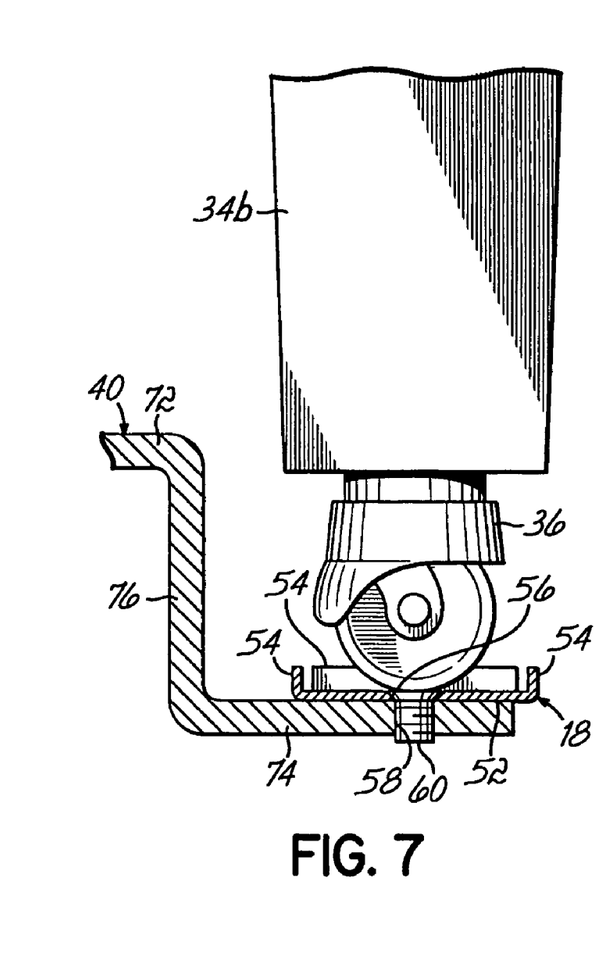
FIG. 7 is an enlarged fragmentary view of a portion of the dolly shown in FIGS. 1-6.

The first end member 38 of the first leg 14 of dolly 10 includes a first, relatively higher, substantially horizontally extending portion 46, a second, relatively lower, substantially horizontally extending portion 48 and a substantially vertically extending portion 50 interconnecting the substantially horizontally extending portions 46 and 48. One of the receptacles 18, which comprises a flanged cup in the illustrative embodiment, is mounted to the second, relatively lower, substantial horizontally extending portion 48 of end member 38 of leg 14. As may be appreciated with reference to the enlarged fragmentary view illustrated in FIG. 7, each of the flanged cups 18 includes a base 52 and a plurality of walls 54 that are integral with and extend upwardly from the base 52. In this manner, the flanged cups 18 prevent the wheels of the casters 36 mounted to each of the piano legs 34a, 34b, and 34c, from rolling off of dolly 10.

Each of the flanged cups 18 includes a hole 56 formed in the base 52 and the relatively lower, substantially horizontally extending portion 48 has a mating hole 58 formed therein. Each of the flanged cups 18 are upwardly facing with an open top so that each cup 18 can accept one of the casters 36 of piano 30. One of the flanged cups 18 is mounted to portion 48 with a conventional fastener, such as countersunk screw 60 which passes through hole 56 in flanged cup 18 and is threaded into the hole 58 formed in portion 48 of leg 14. However, it may be appreciated that the flanged cup 18 may be secured to portion 48 by other conventional means such as other fasteners, including one or more rivets, or by other conventional means such as welding or the like.

Figure 4:
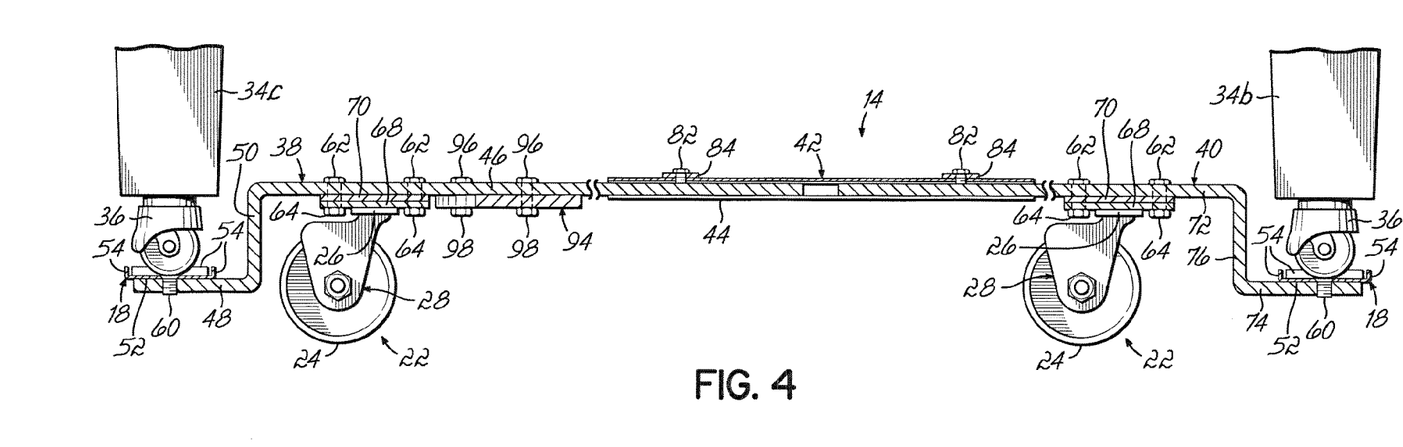
FIG. 4 is a cross-sectional view taken along line 4-4 in FIG. 3.

One of the casters 22 is mounted to the relatively higher, substantially horizontally extending portion 46 of end member 38 of leg 14, by conventional fasteners such as bolts 62 and nuts 64, with each bolt 62 passing through one of a plurality of holes 66 formed in the first end member 38 and corresponding holes formed in a flange 68 of the corresponding one of casters 22. In the illustrative embodiment, a reinforcing plate 70 is positioned intermediate of the first end member 38 of leg 14 and the flange 68 of the corresponding caster 22, for structural considerations. As may be appreciated with reference to FIG. 4, the first, relatively higher, substantially horizontally extending portion 46 of end member 38 is telescopically engaged with sleeve 42.

The second end member 40 of leg 14 is configured similar to the first end member 38 of leg 14. Accordingly, the second end member 40 includes a first, relatively higher, substantially horizontally extending portion 72, a second, relatively lower, substantially horizontally extending portion 74 and a substantially vertically extending portion 76 integral with and interconnecting portions the substantially horizontally extending portions 72 and 74. A second one of the flanged cups 18 is mounted to the relatively lower, substantially horizontally extending portion 74, using a conventional fastener such as countersunk screw 60 as described previously with respect to the mounting of a flanged cup 18 to portion 48 of end member 38. A second caster 22 is mounted to the relatively higher, substantially horizontally extending portion 72 of the second end member 40, using conventional fasteners such as bolts 62 and nuts 64, in the same manner as described previously with respect to the mounting of one of the casters 22 to the portion 46 of the first end member 38 of leg 14. The two casters 22 mounted to the first leg 14 extend downwardly therefrom so that the included wheels 24 can engage a surface, upon which dolly 10 rests. As may be appreciated with reference to FIG. 4, the relatively higher, substantially horizontally extending portion 72 of end member 40 is telescopically engaged with, and disposed partially within, sleeve 42.

Figure 3:
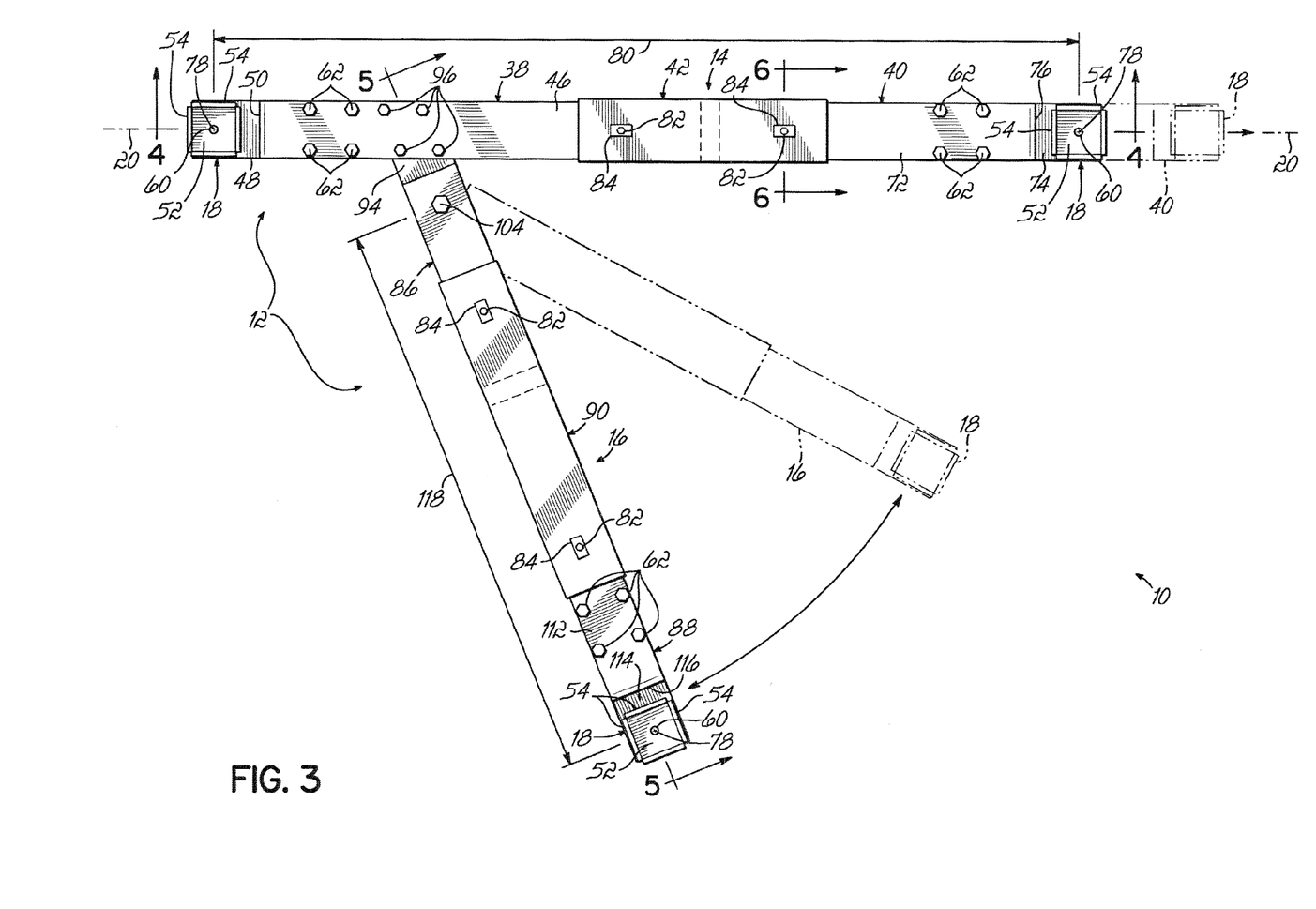
FIG. 3 is an assembled view of the dolly shown in FIG. 1, further illustrating how angular and length adjustments can be made to the dolly.

Referring now to FIG. 3, each of the flanged cups 18 mounted to the first leg 14 of dolly 10, includes a geometric center 78. In the illustrative embodiment, the geometric centers 78 of cups 18 correspond to the centers of mount holes 56 formed in cups 18. However, it is not necessary that the geometric center 78 of each flanged cup 18 correspond with the center of the mount hole 56. The first leg 14 includes a first length 80 which extends between the geometric center 78 of the two flanged cups 18 mounted to leg 14. As illustrated in phantom line in FIG. 3, the length 80 of the first leg 14 can be adjusted. Once the desired magnitude of length 80 has been determined, the first 38 and second 40 end members are appropriately positioned within sleeve 42. The end members 38, 40, are then secured to sleeve 42 so that they cannot move relative to sleeve 42. In the illustrative embodiment, this is accomplished with the use of a pair of set screws 82. A pair of spaced apart threaded nuts 84 are fixed to the sleeve 42 by conventional means such as welding. Each of the set screws 82 is threaded into one of the nuts 84 and passes through a mating hole formed in sleeve 42, with one of the set screws 82 engaging the first end member 38 and the other set screw 82 engaging the second end member 40, thereby securing end members 38, 40 to sleeve 42.

Figure 2:
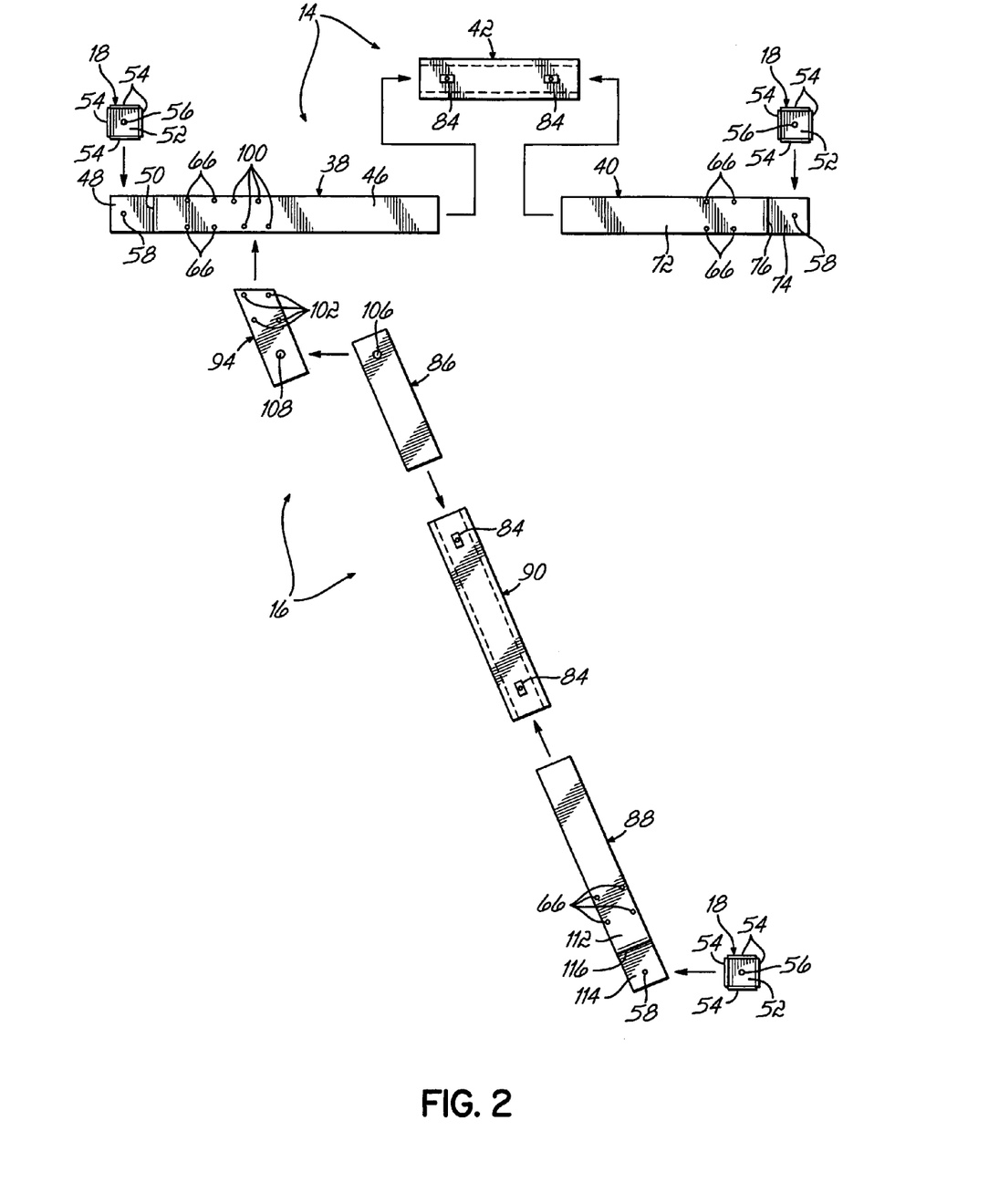
FIG. 2 is an exploded assembly view of the legs of the dolly shown in FIG. 1.
Figure 5:
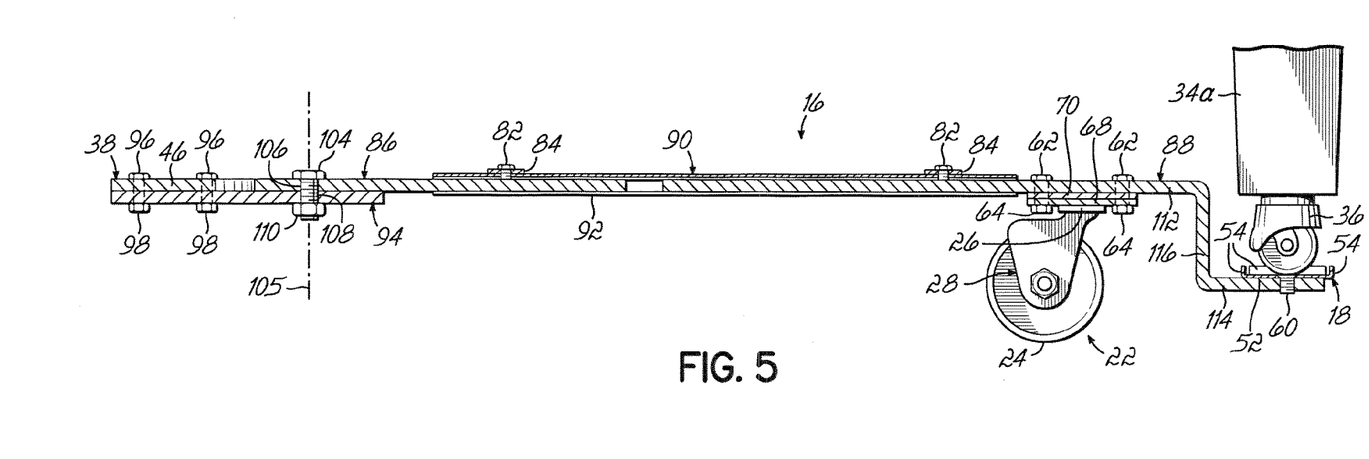
FIG. 5 is a cross-sectional view taken along line 5-5 in FIG. 3.

Referring now to FIGS. 2, 3, and 5, the second leg 16 of dolly 10 includes a first end member 86, a second end member 88, and a sleeve 90 disposed intermediate of the first 86 and second 88 end members. The first and second end members, 86, 88 are telescopically engaged with the sleeve 90 and are disposed partially within sleeve 90. In the illustrative embodiment, the end members 86, 88 comprise bars having a substantially rectangular cross section and the sleeve 90 is configured similar to sleeve 42 of the first leg 14 and comprises a hollow channel with a bottom wall 92 being partially open. However, as discussed previously with regard to the first leg 14, the end members 86, 88 and the sleeve 90 can have different configurations within the scope of the present invention.

Dolly 14 further includes a coupling member 94 which is secured to the first end member 38 of leg 14 by conventional means. In the illustrative embodiment, coupling member 94 is fixedly attached to the end member 38 of leg 14 by a plurality of conventional fasteners such as bolts 96 and nuts 98. Each of the bolts 96 passes through one of a plurality of holes 100 formed in the first end member 38 of leg 14 and a corresponding and aligned one of a plurality of holes 102 formed in the coupling member 94.

The first end member 86 of leg 16 is pivotally coupled to the coupling member 94 via a single pivot 104. Accordingly, the second leg 16 of dolly 10 is also pivotally coupled to the first leg 14 of dolly 10. In the illustrative embodiment the pivot 104 is a conventional threaded bolt. Pivot 104 passes through a hole 106 formed in the end member 86 of leg 16 and a mating hole 108 formed in coupling member 94. Leg 16 can be pivoted about a vertical axis 105 passing through pivot 104 to various positions, with one position illustrated in solid line in FIG. 3 and another position illustrated in phantom line in FIG. 3. Once the desired angular orientation of leg 16 is determined, to accommodate a particular piano such as piano 30, a conventional fastener, such as nut 110, is threaded onto the pivot 104 thereby securing the first leg 16 to the coupling member 94 so that leg 16 can no longer pivot.

The second end member 88 of leg 16 includes a first, relatively higher, substantially horizontally extending portion 112, a second, relatively lower, substantially horizontally extending portion 114 and a substantially vertically extending portion 116 integral with and interconnecting the substantially horizontally extending portions 112 and 114. A third one of the flanged cups 18 is mounted to the relatively lower, substantially horizontally extending portion 114 of end member 88 and rests on an upper surface thereof. The flanged cup 18 is mounted to portion 114 using a countersunk screw 60 in the illustrative embodiment, as discussed previously with regard to the cups 18 mounted to leg 14. One of the castors 22 is mounted to the second, relatively higher, substantially horizontally extending portion 112 of end member 88 via a plurality of conventional fasteners, such as bolts 62 and nuts 64 as discussed previously with regard to the castors 22 mounted to first leg 14 of dolly 10. In the illustrative embodiment, a reinforcement plate or flange 70 is disposed between portion 112 of end member 88 and the mount flange 68 of castor 22.

Leg 16 has a length 118 that extends between the center of pivot 104 and the geometric center 78 of the flanged cup 18 mounted to leg 16. The magnitude of length 118 can be adjusted. Once the desired magnitude of length 118 is achieved, by varying the telescopic engagement of end members 86 and 88 within sleeve 90, the length 118 is fixed by securing end members 86 and 88 to sleeve 90 using a pair of set screws 82. A pair of spaced apart threaded nuts 84 are fixed to sleeve 90 by conventional means such as welding. Each of the set screws 82 is threaded into one of the nuts 84 and passes through a mating hole formed in sleeve 90, with one of the set screws 82 engaging the first end member 86 and the other set screw 82 engaging the second end member 88, thereby securing the first and second end members 86, 88 to sleeve 90.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. A dolly for moving a piano, comprising:
a base having first and second legs;
a plurality of receptacles located on said base, each of said receptacles being operatively effective for receiving a caster mounted to a leg of the piano, first and second ones of said receptacles being located on said first leg and longitudinally spaced apart from one another;
a plurality of roller assemblies mounted to said base and operatively effective for rolling along a surface;
said second leg being pivotally coupled, at a first end thereof, to said first leg, intermediate said first and second receptacles, for rotation relative to said first leg, a third one of said receptacles being located on said second leg proximate an opposite end thereof.

2. A dolly as recited in claim 1, wherein;
said first leg has a first length and said second leg has a second length; and
said first and second lengths are each selectively adjustable variable lengths.

3. A dolly as recited in claim 2, further comprising:
a coupling member extending between and coupling said first and second legs, said coupling member being secured to said first leg at one end thereof and coupled to said second leg via a pivot at an opposite end thereof, said second leg being rotatable about a vertical axis passing through said pivot; wherein
said second selectively adjustable variable length of said second leg extends between said vertical axis and said center of said third one of said receptacles.

4. A dolly as recited in claim 3, wherein:
each of said receptacles is a flanged cup.

5. A dolly as recited in claim 1, wherein:
said first leg includes first and second end members and a sleeve disposed intermediate of said first and second end members, said first and second end members being adjustably telescopically engaged partially within said sleeve.

6. A dolly as recited in claim 5, wherein:
said second leg includes first and second end members and a sleeve disposed intermediate of said first and second end members, said first and second end members being adjustably telescopically engaged partially within said sleeve.

7. A dolly as recited in claim 6, wherein:
said first and second end members of said first leg and said outer end member of said second leg, each include a first, relatively higher, substantially horizontally extending inner portion, a second, relatively lower, substantially horizontally extending outer portion and a substantially vertically extending portion interconnecting said first and second substantially horizontally extending portions and wherein said receptacles are located on different ones of said lower portions of said end members and are upwardly facing.

8. A dolly as recited in claim 7, wherein:
each of said roller assemblies is secured to said first, relatively higher, substantially horizontally extending inner portion of its respectively associated end member.

9. A dolly as recited in claim 8, wherein:
each of said relatively higher, substantially horizontally extending inner portions of said end members of said first leg and said second leg are telescopically engaged with their respective associated sleeve.

10. A dolly as recited in claim 6, wherein:
said first end member of said second leg is pivotally coupled, at one end thereof, to said first leg and is adjustably telescopically engaged, at the other end thereof, to said sleeve of said second leg.

11. A dolly for moving a piano comprising:
a base having first and second legs, said first leg having a first substantially longitudinal axis along its length interconnecting its opposite ends, the length of said first leg measured along said first longitudinal axis being selectively adjustably variable, said second leg having a second substantially longitudinal axis along its length interconnecting its opposite ends, said second leg being pivotally coupled to said first leg at a point between the ends thereof for pivotal movement in a substantially horizontal plane relative to said first leg when said first leg is disposed in a substantially horizontal plane;

a plurality of receptacles located on said base, each of said receptacles being operatively effective for receiving a caster mounted to a leg of the piano, first and second ones of said receptacles being located on said first leg and spaced apart from one another along said first longitudinal axis, a third one of said receptacles being located on said second leg; and a plurality of roller assemblies mounted to said base and operatively effective for rolling said base along an underlying surface.

12. The dolly of claim 11, wherein the length of said second leg measured along said second substantially longitudinal axis is selectively adjustably variable.

13. The dolly of claim 12, wherein:

said first one of said receptacles is located on said first leg proximate one of its opposite ends and said second one of said receptacles is located on said first leg proximate the other of its opposite ends;

said second leg includes a first, inner end pivotally coupled to said first leg and a second, outer end, said third one of said receptacles is located on said second leg proximate said outer end of said second leg.

14. A method of mounting a piano on a dolly, said piano having first, second and third spaced apart generally vertical legs, the lower ends of which are arranged in a generally triangular configuration in substantially the same plane, and said dolly comprising a base having first and second legs, the first leg having a first substantially longitudinal axis along its length interconnecting its opposite ends, the length of the first leg measured along the first longitudinal axis being selectively adjustably variable, and a second selectively adjustably variable length leg having a second substantially longitudinal axis along its length interconnecting its opposite ends, the second leg being pivotally coupled at its inner end to the first leg at a point between the ends thereof for pivotal movement in a substantially horizontal plane relative to the first leg when the first leg is disposed in a substantially horizontal plane, the dolly further including a plurality of receptacles, first and second ones of the receptacles being located on the first leg and spaced apart from one another along the first longitudinal axis, a third one of the receptacles being located on the outer end of the second leg, said method comprising the steps of:

adjusting the length of the first dolly leg to position the receptacles thereof at a first distance substantially equal to the distance between the lower ends of the first and second piano legs, adjusting the pivot angle between the first and second legs of the dolly and adjusting the length of the second dolly leg, to collectively locate the receptacle of the second dolly leg to receive the lower end of the third piano leg when the first and second receptacles are located to receive the lower ends of the first and second piano legs, and placing the lower ends of the first, second and third piano legs in the first, second and third receptacles.

* * * * *

UNITED STATES PATENT AND TRADEMARK OFFICE
CERTIFICATE OF CORRECTION

PATENT NO. : 7,287,766 B2  Page 1 of 1
APPLICATION NO. : 11/174926
DATED : October 30, 2007
INVENTOR(S) : Gary R. Kilday and Michael W. Pruitt

It is certified that error appears in the above-identified patent and that said Letters Patent is hereby corrected as shown below:

Title Page

Add to (56) References Cited on the front page, -- 442,825  A  12/1890  Randall --.

Signed and Sealed this

Twenty-eighth Day of July, 2009

JOHN DOLL
*Acting Director of the United States Patent and Trademark Office*